United States Patent
Egi et al.

(10) Patent No.: US 9,645,956 B2
(45) Date of Patent: *May 9, 2017

(54) DELIVERING INTERRUPTS THROUGH NON-TRANSPARENT BRIDGES IN A PCI-EXPRESS NETWORK

(71) Applicant: Futurewei Technologies, Inc., Plano, TX (US)

(72) Inventors: Norbert Egi, Santa Clara, CA (US); Robert Lasater, Menlo Park, CA (US); Thomas Boyle, Santa Clara, CA (US); John Peters, Sunnyvale, CA (US); Guangyu Shi, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/287,985

(22) Filed: Oct. 7, 2016

(65) Prior Publication Data

US 2017/0024340 A1    Jan. 26, 2017

Related U.S. Application Data

(63) Continuation of application No. 14/083,206, filed on Nov. 18, 2013, now Pat. No. 9,465,760.

(51) Int. Cl.
*G06F 13/00* (2006.01)
*G06F 13/24* (2006.01)
(Continued)

(52) U.S. Cl.
CPC ............ *G06F 13/24* (2013.01); *G06F 13/404* (2013.01); *G06F 13/4068* (2013.01);
(Continued)

(58) Field of Classification Search
CPC .. G06F 13/32; G06F 13/4221; G06F 13/4282; G06F 13/24
(Continued)

(56) References Cited

U.S. PATENT DOCUMENTS 7,979,592 B1 * 7/2011 Pettey .................... G06F 13/404
  709/205
9,465,760 B2 * 10/2016 Egi ......................... G06F 13/32
(Continued)

*Primary Examiner* — Tammara Peyton
(74) *Attorney, Agent, or Firm* — Futurewei Technologies, Inc.

(57) ABSTRACT

An apparatus for initialization. The apparatus includes a management I/O device controller for managing initialization of a plurality of I/O devices coupled to a PCI-Express (PCIe) fabric. The management I/O device controller is configured for receiving a request to register a target interrupt register address of a first worker computing resource, wherein the target interrupt register address is associated with a first interrupt generated by a first I/O device coupled to the PCIe fabric. A mapping module of the management I/O device controller is configured for mapping the target interrupt register address to a mapped interrupt register address of a domain in which the first I/O device resides. A translating interrupt register table includes a plurality of mapped interrupt register addresses in the domain that is associated with a plurality of target interrupt register addresses of a plurality of worker computing resources.

15 Claims, 6 Drawing Sheets

(51) Int. Cl.
    *G06F 13/42*       (2006.01)
    *G06F 13/40*       (2006.01)
    *G06F 13/32*       (2006.01)

(52) U.S. Cl.
    CPC .......... *G06F 13/4282* (2013.01); *G06F 13/32* (2013.01); *G06F 13/4221* (2013.01); *G06F 2213/0026* (2013.01)

(58) Field of Classification Search
    USPC ................................................ 710/312, 313
    See application file for complete search history.

(56) References Cited

U.S. PATENT DOCUMENTS

| | | | | |
|---|---|---|---|---|
| 2005/0157754 | A1* | 7/2005 | Pettey | G06F 3/00 370/469 |
| 2008/0147959 | A1* | 6/2008 | Freimuth | G06F 12/145 711/100 |
| 2009/0248947 | A1* | 10/2009 | Malwankar | G06F 13/404 710/316 |
| 2010/0074264 | A1* | 3/2010 | Davis | G06F 11/0709 370/401 |
| 2011/0047309 | A1* | 2/2011 | Brinkmann | G06F 13/24 710/261 |
| 2011/0302349 | A1* | 12/2011 | Griggs | G06F 13/26 710/311 |

\* cited by examiner

DELIVERING INTERRUPTS THROUGH NON-TRANSPARENT BRIDGES IN A PCI-EXPRESS NETWORK

CROSS REFERENCE TO RELATED CASES

This application is a continuation of U.S. application Ser. No. 14/083,206, filed on Nov. 18, 2013, now U.S. Pat. No. 9,465,760, which is hereby incorporated by reference in its entirety.

BACKGROUND

PCI-Express (PCIe) as the successor of the PCI (Peripheral Component Interconnect) technology is the most widely used interconnect between a central processing unit (CPU) and its peripherals, as deployed within PCs and servers. PCIe provides for a high throughput, low-latency, packet based and switched interconnection technology. PCIe is currently mostly deployed within single enclosures (i.e., servers and PCs) and primarily at the printed circuit board (PCB) level. PCIe with all its attributes and advantages, can clearly become a flexible and cost efficient alternative to traditional Data Center interconnect technologies, such as Ethernet (ETH) and InfiniBand (IB).

For instance, a single PCI-Express link can scale up to 256 Gbps (gigabits-per-second) with a latency of approximately 130 nanoseconds per switch hop. The bandwidth of links can be flexibly configured from 1 to 16 lanes, wherein lane counts have to be a power of 2, with 8 Gbps per lane (as of Generation 3 PCIe technology). PCIe switches are capable of interconnecting links with different speeds (i.e. number of lanes) and lane counts per link (i.e. switch port) can be dynamically reconfigured.

The PCIe technology provides hardware level resource sharing with a large set of different PCIe based I/O devices supporting this technology. The technology itself is so widely used within servers, that the majority of the latest CPUs already have PCIe built into the chip, not requiring any additional chipset to be connected between the CPU and the peripherals. With this, clusters or Data Centers based on a PCIe interconnect, would achieve greatly improved cost efficiency, due to the lower number and types of components needed in the system. In addition, compared to ETH and IB the power consumption of PCIe switches is several times lower per Gbps, further contributing to the cost efficiency of such a system.

As per functionality, besides hardware-level resource virtualization, it also provides RDMA (Remote Direct Memory Access) functionality, making it a viable solution for high-speed, low-latency CPU-to-CPU communication. PCIe also uses built in credit-based flow-control, providing reliable data transfer at the hardware level, requiring a much "slimmer" software stack. The technology also supports cabling for the network to span larger distances and is flexible enough to support different network topologies. There are several well-proven solutions with low cost adapters and cables, making it a potential, cost-efficient Data Center interconnect.

Another great advantage of the PCIe technology is that its standardization organization (i.e. PCI-SIG) only defines the protocol and packet formats. That is, vendors implementing PCIe are free to implement any functionality inside their devices (i.e. switches, end-points, etc.). As such, PCIe provides a great level of flexibility and potential for supporting different functionalities for applications missing from other Data Center interconnection technologies.

In particular, the PCIe architecture is a point-to-point topology, with serial links connecting every device to the root host. PCIe devices communication via logical interconnections or links. The link provides for point-to-point communications over a channel between two PCIe ports. This allows both ends to send and/or receive ordinary PCIe requests (e.g., configuration read/write, I/O read/write, memory read/write, etc.), and interrupts (INTx, MSI, MSI-X, etc.).

In a typical use of PCIe of communication between a CPU and its peripherals, initialization of an interrupt provides for programming a memory address as a destination address (e.g., of an interrupt handler) at the corresponding peripheral. Initialization allows for delivery of interrupts from the peripheral to the CPU for handling. When everything is internal to the CPU, the CPU can properly program its peripherals during interrupt initialization. However, when extending PCIe for use as a unified interconnect technology between components of a data center, interrupt initialization is problematic because the CPU programming the interrupt at the device may not be aware of the proper address. In that case, initialization will fail.

It would be advantageous to provide for interrupt initialization in off-the-shelf PCIe devices for multiple independent CPUs when PCIe is used as a interconnect technology between components of a Data Center.

SUMMARY

An apparatus for initialization. The apparatus includes a management I/O device controller for managing initialization of a plurality of I/O devices coupled to a PCI-Express (PCIe) fabric. The management I/O device controller is configured for receiving a request to register a target interrupt register address of a first worker computing resource, wherein the target interrupt register address is associated with a first interrupt generated by a first I/O device coupled to the PCIe fabric. A mapping module of the management I/O device controller is configured for mapping the target interrupt register address to a mapped interrupt register address of a domain in which the first I/O device resides. A translating interrupt register table includes a plurality of mapped interrupt register addresses in the domain that is associated with a plurality of target interrupt register addresses of a plurality of worker computing resources.

In still other embodiments, a system for initializing interrupts is disclosed. They system includes a plurality of worker computing resources. A plurality of target interrupt registers is associated with the plurality of worker computing resources, wherein the target interrupt registers includes destination and/or interrupt register addresses each associated with a corresponding interrupt and corresponding interrupt handling routine. The system includes a plurality of I/O devices (e.g., peripheral devices) located on the plurality of worker computing resources. The system includes a PCI Express fabric for enabling communication between the plurality of I/O devices and the plurality of worker computing resources, all of which are coupled to the PCIe fabric. The system includes a management I/O device controller or link controller that is configured for managing, in part, initialization of the plurality of I/O devices. The system includes a translating interrupt register table comprising a plurality of mapped interrupt register addresses associated with a plurality of target interrupt register addresses of said plurality of worker computing resources. The translating interrupt register table is associated with and controlled by the management I/O device controller. Additionally, the management I/O device controller is configured for receiving a request to register a target interrupt register address of a first target interrupt register of a first worker computing resource, wherein the target interrupt register address is associated with a first interrupt generated by a first I/O device coupled to the PCIe fabric. The system includes a mapping module of the management I/O device controller that is configured for mapping the target interrupt register address to a mapped interrupt register address.

In other embodiments, a method for initializing interrupts is disclosed. The method includes receiving a request to register a target destination and/or interrupt register address of a first worker computing resource. The destination or target interrupt register address is associated with a first interrupt generated by a first I/O device coupled to a PCI Express (PCIe) fabric. The method includes mapping the target interrupt register address to a mapped interrupt register address of a domain in which the first I/O device resides. The method includes sending instructions to the first I/O device to register the mapped interrupt register address in association with the first interrupt in a corresponding I/O interrupt vector table of the first I/O device.

In one embodiment, a computer system comprises a processor coupled to memory having stored therein instructions that, if executed by the computer system, cause the computer to execute a method for initializing interrupts is disclosed. The method includes receiving a request to register a target destination and/or interrupt register address of a first worker computing resource. The destination or target interrupt register address is associated with a first interrupt generated by a first I/O device coupled to a PCI Express (PCIe) fabric. The method includes mapping the target interrupt register address to a mapped interrupt register address of a domain in which the first I/O device resides. The method includes sending instructions to the first I/O device to register the mapped interrupt register address in association with the first interrupt in a corresponding I/O interrupt vector table of the first I/O device.

In some embodiments, an apparatus includes a tangible, non-transitory computer-readable storage medium having stored thereon, computer-executable instructions that, when executed causes the computer system to perform a method for initializing interrupts is disclosed. The method includes receiving a request to register a target destination and/or interrupt register address of a first worker computing resource. The destination or target interrupt register address is associated with a first interrupt generated by a first I/O device coupled to a PCI Express (PCIe) fabric. The method includes mapping the target interrupt register address to a mapped interrupt register address of a domain in which the first I/O device resides. The method includes sending instructions to the first I/O device to register the mapped interrupt register address in association with the first interrupt in a corresponding I/O interrupt vector table of the first I/O device.

These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

FIG. 1 is a block diagram of a PCIe cluster illustrating the relationship between address spaces in a plurality of worker computing resources and address spaces in a management I/O device controller as implemented by a plurality of I/O devices, all of which are coupled to a PCIe fabric, in accordance with one embodiment of the present disclosure.

FIG. 2 is a block diagram of a PCIe cluster implemented via a PCIe adapter and a management link CPU and I/O device controller, wherein the management link CPU and I/O device controller is configured for managing initialization of a plurality of I/O devices coupled to the PCI-Express (PCIe) fabric forming the interconnect to the PCIe cluster, in accordance with one embodiment of the present disclosure.

Figure 5:
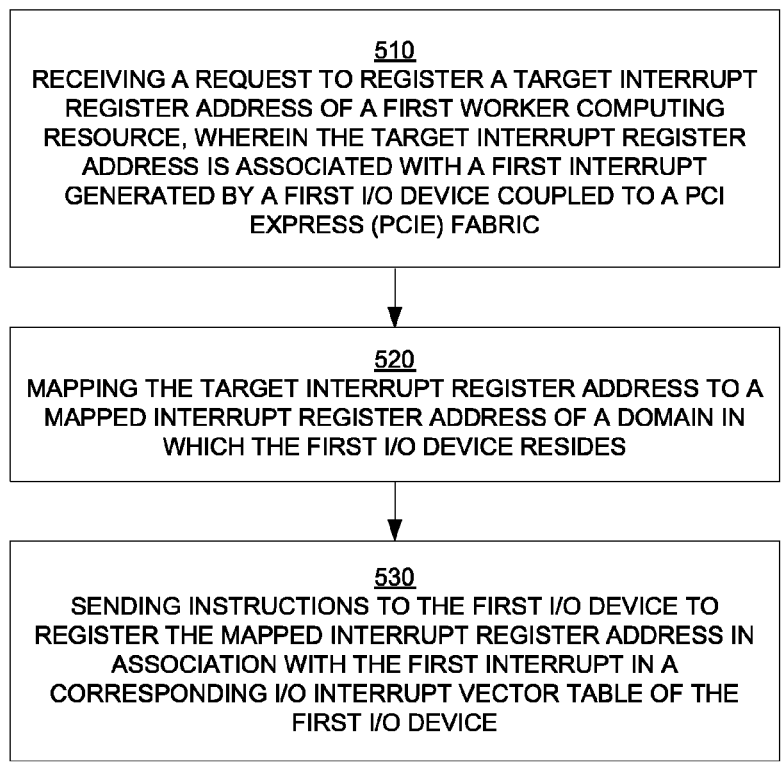

FIG. 5 flow diagram illustrating a method for initializing an interrupt in an I/O device as implemented by a management I/O device controller, wherein the interrupt is deliverable to a computing resource coupled to a PCIe fabric, in accordance with one embodiment of the present disclosure.

Figure 6:
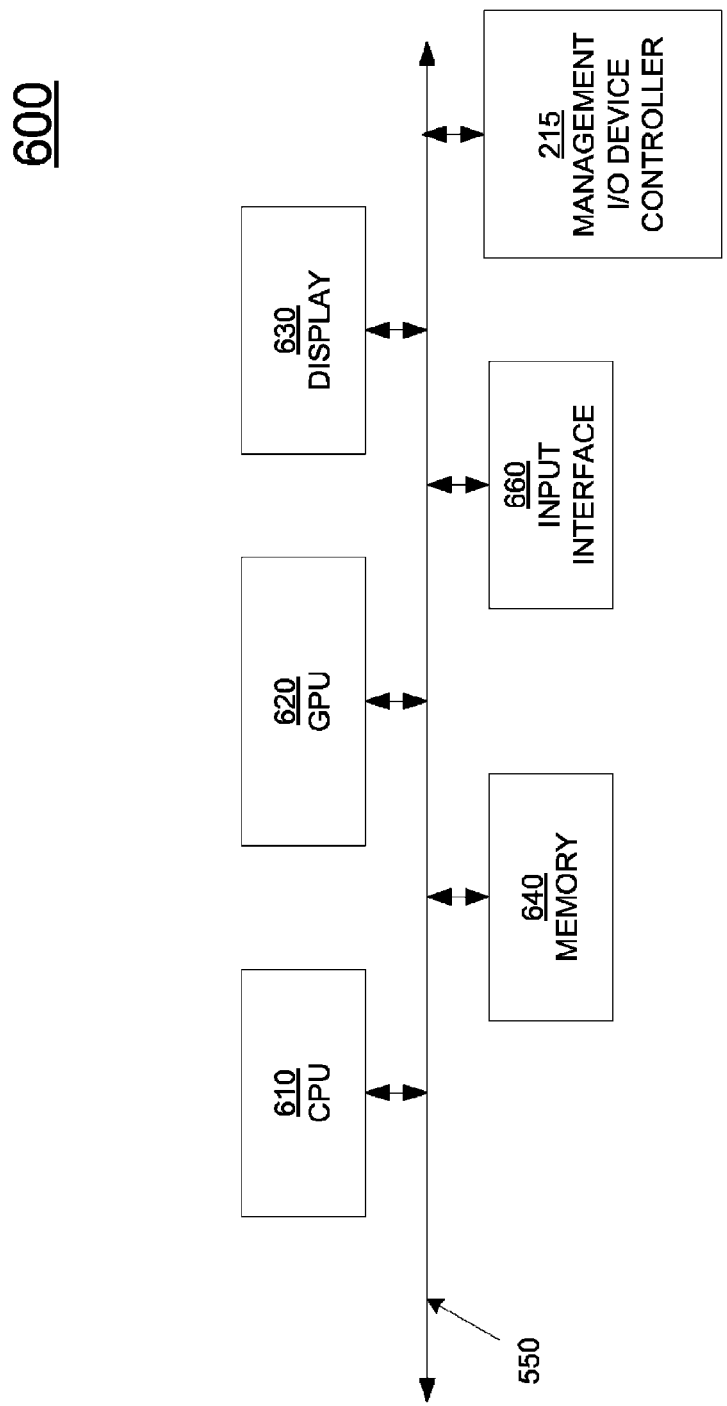

FIG. 6 depicts a block diagram of an exemplary computer system suitable for implementing the present methods in accordance with one embodiment of the present disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present disclosure provide for initializing and delivering interrupts (e.g., Message Signaled Interrupts eXtended, also referred to as "MSI-x", MSI, etc.) to computing resources placed behind non-transparent bridges (NTBs) in a PCIe network based cluster.

Figure 1:
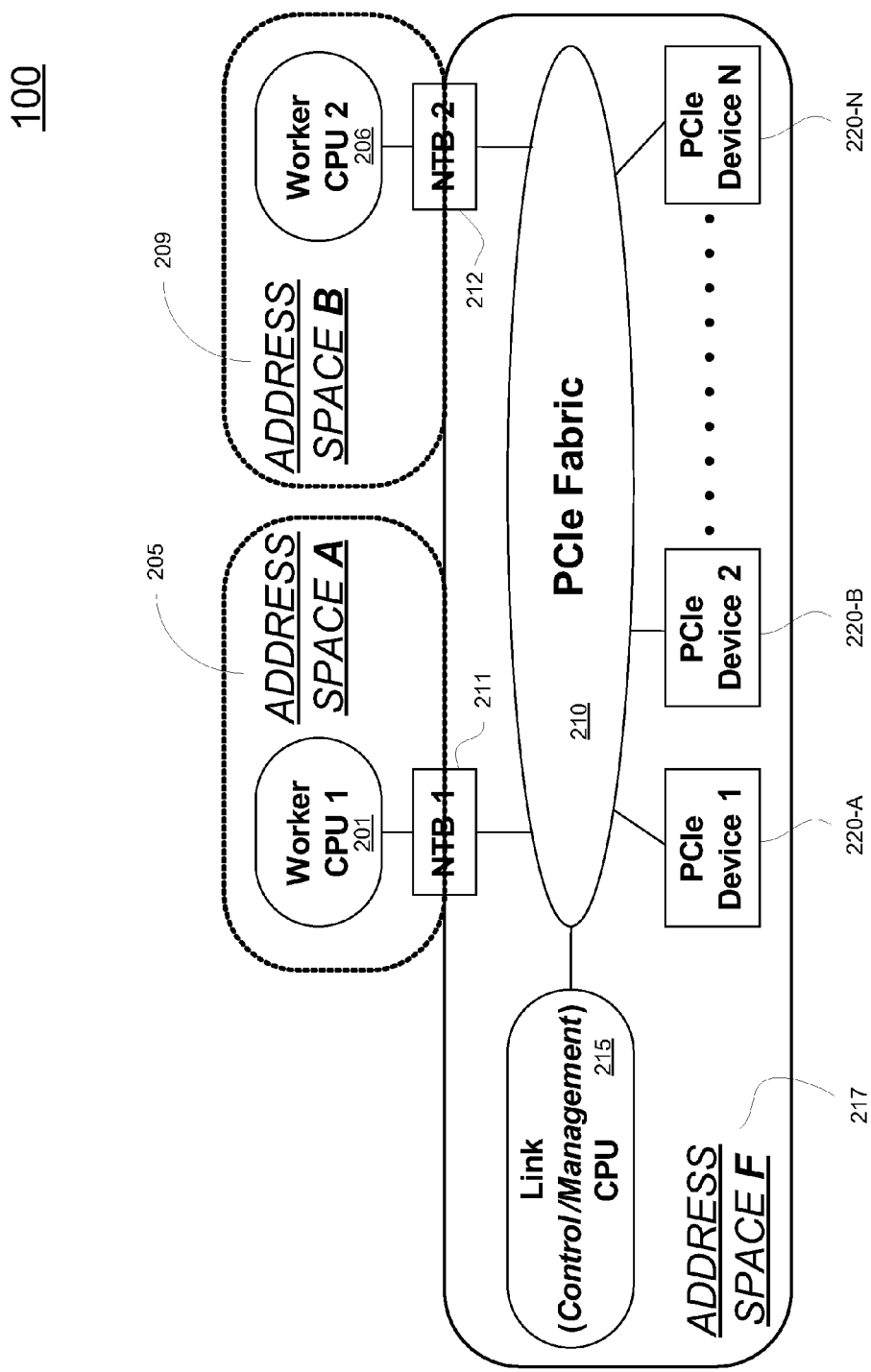

FIG. 1 is a block diagram of a PCIe cluster 100 illustrating the relationship between address spaces in a plurality of worker computing resources and address spaces in a management I/O device controller as implemented by a plurality of I/O devices, all of which are coupled to a PCIe fabric, in accordance with one embodiment of the present disclosure.

FIG. 1 illustrates a PCI-Express cluster 100 with a single Management (a.k.a. Link) CPU controlling all the resources in the main fabric address domain (F). In the PCIe cluster 100, there are a plurality of worker computing resources (e.g., CPUs) positioned behind an NTB each with their own PCIe address domains (A and B in the 2 node example in FIG. 1). In particular, a first worker computing resource 201 is coupled to the PCIe fabric 210 via NTB 211; and a second worker computing resource 206 is coupled to the PCIe fabric 210 via NTB 212. Although only two worker resources are shown, embodiments of the present invention are scalable and can support multiple or N worker computing resources.

Each of the worker computing resources is associated with a corresponding address space. For example, worker computing resource 201 has an address space A 205, and worker computing resource 206 has an address space B 209. The address space includes addresses that are configured as interrupt register addresses. These interrupt register addresses may be included in an interrupt register, which includes destination addresses to which interrupts are delivered for handling by the appropriate interrupt handler.

As shown the main PCIe fabric 210 is configured to communicatively couple a plurality of devices (e.g., computing resources, I/O devices, etc.). For example, a plurality of PCIe I/O devices 220A-220N are coupled to the PCIe fabric. PCI-Express is used as a communication standard within the PCIe fabric 210. In particular, a PCIe capable device can communicate with another PCIe capable device via a logical interconnection or link, that includes a point-to-point communication channel between two PCIe ports. In that manner, PCIe requests (e.g., configuration read/write, I/O read/write, memory read/write, etc.) can be sent and received over the PCIe ports. Also, interrupts are deliverable via PCIe, such as, INTx, MSI, MSI-X, etc.).

Although each PCIe I/O devices 220A-220N may be located at a corresponding computing resource, the management of each I/O device is performed by the management link CPU and/or I/O device controller 215. Each of the I/O devices 220A-220N is capable of handling and generating interrupts for delivery to a device capable of receiving interrupts (e.g., CPU) coupled to the PCIe fabric 210. That is, an I/O PCIe device is configured to deliver an interrupt to any device (worker computing resource, etc.) capable of receiving interrupts coupled to the PCIe fabric 210, and not necessarily only to the computing resource in which the PCIe device is located.

In particular, the management I/O device controller 215 is configured for managing initialization of the plurality of I/O devices 220A-220N coupled to the PCI Express (PCIe) fabric 210. Specifically, the management I/O device controller 215 is configured for receiving and initializing a request to register a target interrupt register address of a first worker computing resource. The target interrupt register address is associated with a first interrupt generated by a first I/O device coupled to the PCIe fabric 210. This is accomplished by mapping the target interrupt register address to a mapped interrupt register address in address space F 217 in a domain that is visible to the first I/O device and other I/O devices, as will be described more fully below. As such, the management I/O device controller 215 coordinates the registration of the interrupt with the first I/O device.

Figure 2:
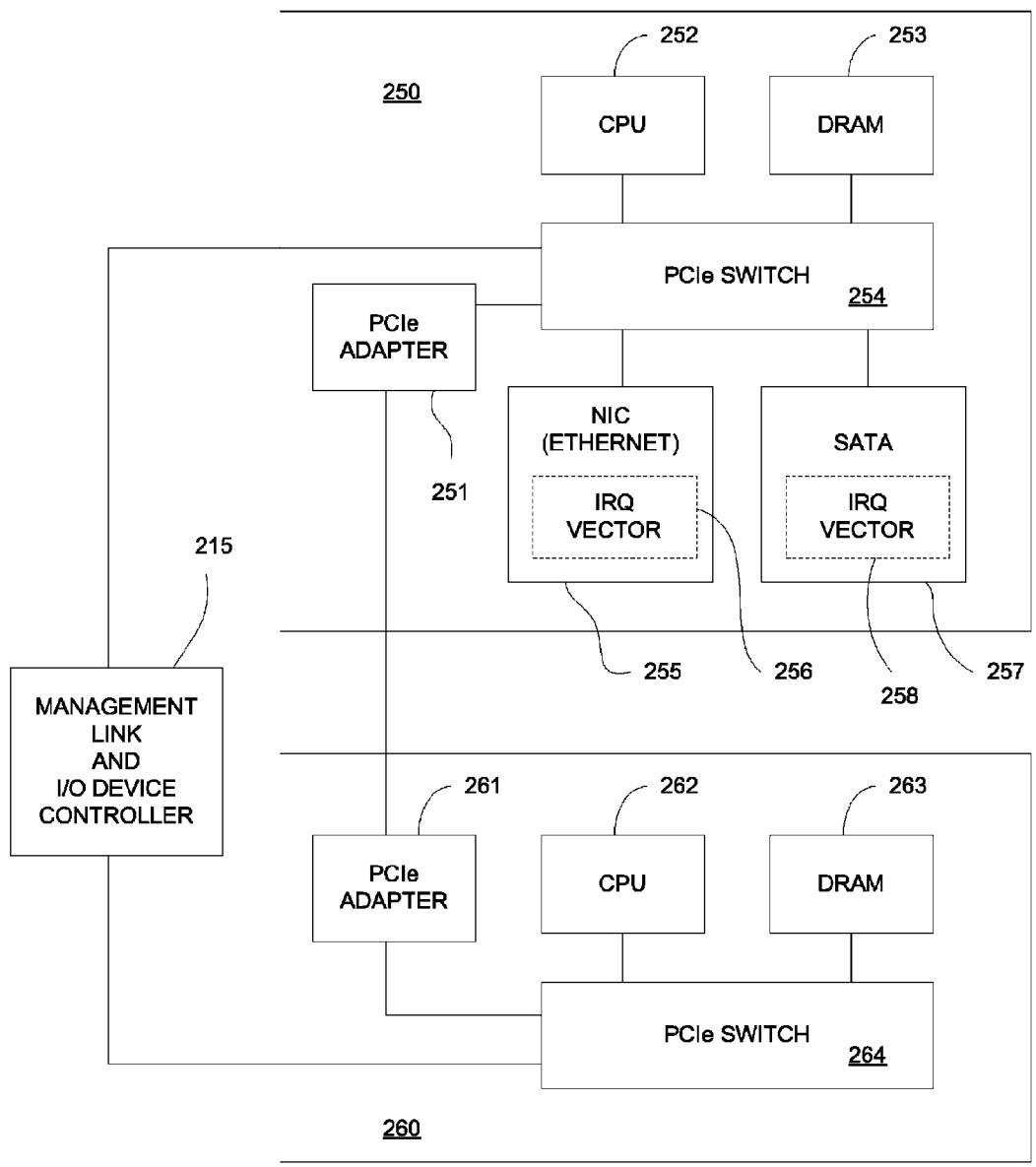

FIG. 2 is a block diagram of a PCIe cluster 200 as implemented via one or more PCIe adapters and a management link CPU and/or I/O device controller 270, in accordance with one embodiment of the present disclosure. As shown, PCIe cluster 200 includes two devices or computing resources 250 and 260. Each of the devices includes one or more I/O devices, such as memory, network interface cards (NICs), SATA RAID memory controllers, etc. FIG. 2 is shown for illustration purposes only, and discloses one implementation of a PCIe fabric. Other embodiments of the present invention support other component configurations for implementing a PCIe fabric.

For instance, PCIe cluster 200 includes computing resource 250, which includes a CPU 252, and memory 253 (e.g., dynamic random access memory, referred to as "DRAM"). Computing resource 250 also includes two I/O devices, a NIC Ethernet card 255, and a SATA memory disk (e.g., RAID) controller). Each of the I/O devices includes an interrupt vector table, which includes address vectors, wherein each vector is associated with a corresponding interrupt and points to an address of an interrupt register used for receiving the interrupt and indirectly initiating the interrupt handling routine). For instance, NIC 255 includes IRQ interrupt vector table 256, and SATA controller 257 includes IRQ interrupt vector table 258. In addition, PCIe cluster 200 includes computing resource 260, which includes a CPU 262, and memory 263 (e.g., DRAM).

A PCIe fabric is configured to communicatively couple computing resources 250 and 260 together. Further, PCIe fabric is configured to couple I/O internal devices located one each of the computing resources 250 and 260 together. In that manner, an I/O device on one computing resource send interrupts to other computing resources coupled to the PCIe fabric.

In particular, the PCIe fabric is implementable through one or more PCIe adapters, PCIe switches, and a management link CPU and/or I/O device controller 270, in one embodiment. Still other components may be utilized to implement the PCIe fabric. For instance, each device 250 and 260 includes a PCIe switch that is configured to route PCIe messages to the proper PCIe channel and/or PCIe port. For instance, device 250 includes PCIe switch 254, and device 260 includes PCIe switch 264, both of which are configured to route messages to and from internal components/devices to other networked components/devices.

PCIe switches 254 and 264 work with PCIe adapters to route messages between networked devices and components of those devices. For instance, computing resource 250 includes PCIe adapter 251, and computing resource 260 includes PCIe adapter 261. PCIe adapters 251 and 261 provide communication channels or links between computing resources 250 and 260 that each use PCIe for communication between internal devices of a single computing resource. That is, a direct link between computing resources 250 and 260 provides for communication using the PCI-Express format, without going through an Ethernet based NIC card and translating messages formatted for PCIe to Ethernet for delivery over the network, and then retranslating back to PCIe for internal communication at the destination computing resource.

In addition, PCIe switches 254 and 264 work with the management link CPU and/or I/O device controller 215 that is configured for managing initialization of a plurality of I/O devices and computing resources coupled to the PCIe fabric, in accordance with one embodiment of the present disclosure. In particular, the management link CPU and/or I/O device controller 215 is configured to map destination addresses of computing resources to mapped interrupt addresses in an interrupt register that is managed by the management link CPU and/or I/O device controller 215, as will be further described below.

Figure 3:
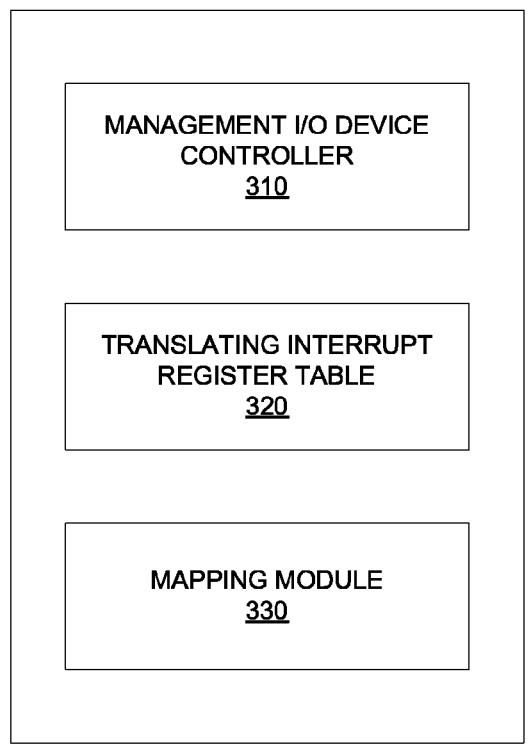
FIG. 3 is a block diagram of an interrupt initialization controller configured to initialize an interrupt in an I/O device, wherein the interrupt is deliverable to a computing resource coupled to a PCIe fabric, in accordance with one embodiment of the present disclosure.

FIG. 3 is a block diagram of an interrupt initialization controller 300 configured to initialize an interrupt in an I/O device, wherein the interrupt is deliverable to a computing resource coupled to a PCIe fabric, in accordance with one embodiment of the present disclosure. As shown, controller 300 includes a management I/O device controller 310, a mapped interrupt register 320, and a mapping module 330.

The management I/O device controller 310 is analogous to the management link CPU and/or I/O device controllers 215 shown in FIGS. 1-2, in embodiments. In particular, management I/O device controller 310 is configured to manage initialization of a plurality of I/O devices coupled to a PCIe fabric. That is, the management I/O device controller 310 is able to connect a worker computing resource, that does not include the I/O device as a component, to the I/O device through the PCIe fabric. More specifically, the management I/O device controller 310 is configured to register a target interrupt register address (e.g., of an interrupt register) of the worker computing resource at the interrupt capable I/O device. The target interrupt register address is associated with a first interrupt that is being registered at the I/O device. After successful registration, the same interrupt generated at the I/O device is delivered to the target or destination interrupt register address through the PCIe fabric via a corresponding mapped interrupt register address, with the help of the management I/O device controller.

More particularly, interrupt initialization controller 300 includes a mapping module 330. In one embodiment, the mapping module 330 is contained within and managed by the management I/O device controller 300. The mapping module is configured for mapping the target interrupt register address, of a corresponding worker computing resource, to a mapped interrupt register address of the translating interrupt register table 320 that is managed by the management I/O device controller 310. More particularly, the translating interrupt register table 320 includes a plurality of mapped interrupt register addresses, wherein the addresses are associated with a plurality of target or destination interrupt register addresses of a plurality of worker computing resources.

For example, referring back to FIG. 1, in order for an I/O device (e.g., 220A-220N), connected to the main PCIe fabric 210, to send an interrupt (e.g., MSI-x interrupt) to a corresponding computing resource, it has to be able to address the interrupt register address of that targeted computing resource. In one implementation, the mapping module 330 is configured to provide that mapping, and programs corresponding NTBs with the proper mapping. That is, the NTB coupling the targeted computing resource to the PCIe fabric 210 is configured to map that destination or target interrupt register address in the worker CPUs' address domain to the mapped interrupt register address of a domain of the plurality of I/O devices and known to the PCIe fabric 210.

Figure 4:
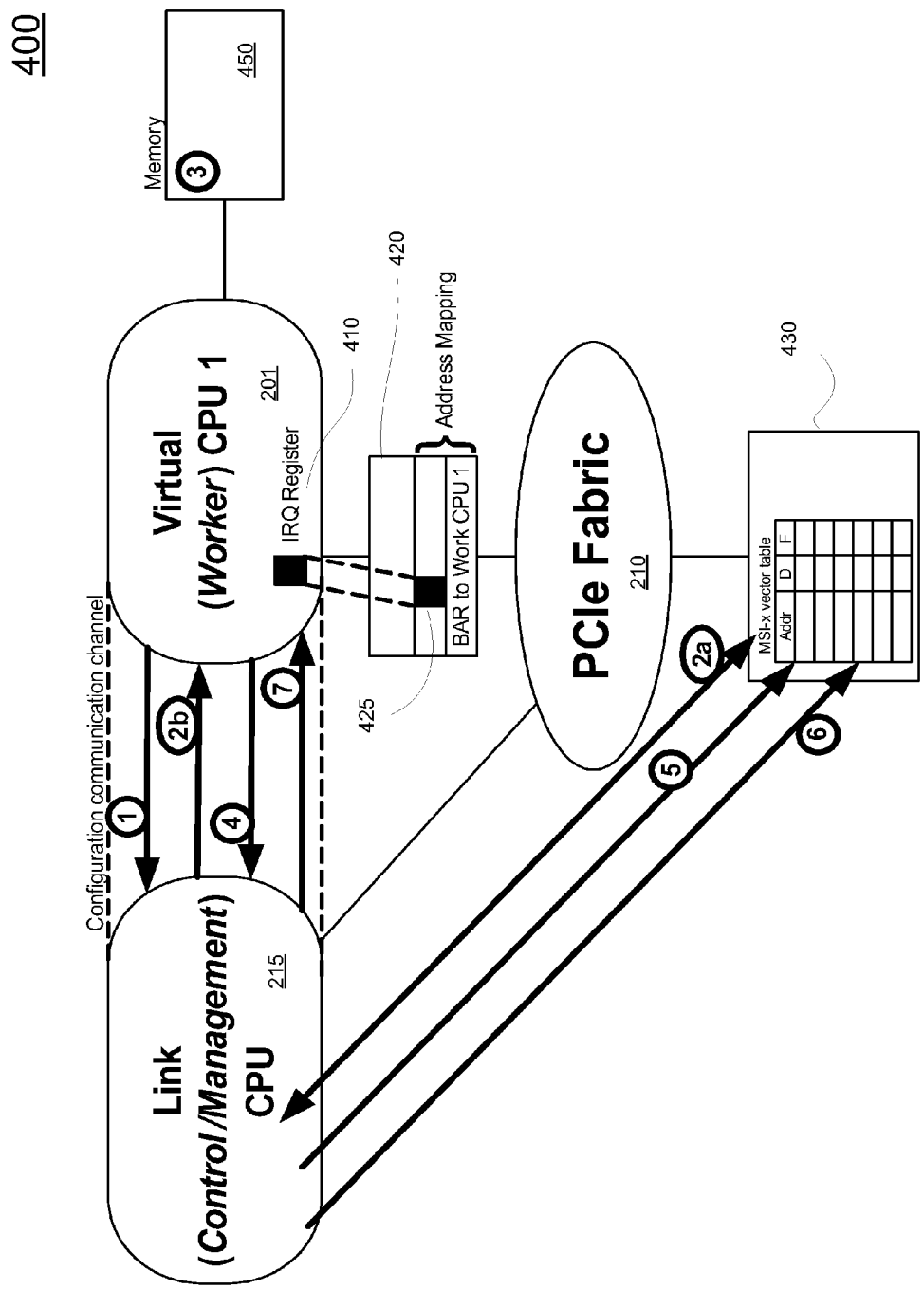
FIG. 4 is an information flow diagram illustrating the flow of information when initializing an interrupt in an I/O device through a management I/O device controller, wherein the interrupt is deliverable to a computing resource coupled to a PCIe fabric, in accordance with one embodiment of the present disclosure.

FIGS. 4 and 5 in combination illustrate the initialization of an interrupt at an I/O device, in a communication system including a plurality of worker computing resources, a plurality of I/O devices, a management I/O device controller, and a PCIe fabric enabling communication between all the components in the system. In particular, FIG. 4 is an information flow diagram 400 illustrating the flow of information when initializing an interrupt in an I/O device through a management I/O device controller, wherein the interrupt is deliverable to a computing resource coupled to a PCIe fabric, in accordance with one embodiment of the present disclosure. Initialization of an interrupt is accomplished by mapping a target interrupt register address of an interrupt register of a corresponding worker computing resource to a mapped interrupt register address of a mapped interrupt register associated with a PCIe fabric.

FIG. 5 flow diagram 500 illustrating a method for initializing an interrupt in an I/O device as implemented by a management I/O device controller, wherein the interrupt is deliverable to a computing resource coupled to a PCIe fabric, in accordance with one embodiment of the present disclosure. In one embodiment, flow diagram 500 illustrates a computer implemented method for initializing an interrupt in an I/O device as implemented by a management I/O device controller, wherein the interrupt is deliverable to a computing resource coupled to a PCIe fabric. In another embodiment, flow diagram 500 is implemented within a computer system including a processor and memory coupled to the processor and having stored therein instructions that, if executed by the computer system causes the system to execute a method for initializing an interrupt in an I/O device as implemented by a management I/O device controller, wherein the interrupt is deliverable to a computing resource coupled to a PCIe fabric. In still another embodiment, instructions for performing the method are stored on a non-transitory computer-readable storage medium having computer-executable instructions for causing a computer system to perform a method for initializing an interrupt in an I/O device as implemented by a management I/O device controller, wherein the interrupt is deliverable to a computing resource coupled to a PCIe fabric as outlined by flow diagram 500. The operations of flow diagram 500 are implemented within the system 600 of FIG. 6 and/or management I/O device controller 215 of FIGS. 1-4, in some embodiments of the present disclosure.

As shown in FIGS. 1, 2, and 4, in one embodiment, mapping is accomplished by a Base Address Register 420 (BAR), in one embodiment. The BAR 420 is allocated a large enough address space (e.g., 64 bit address space). As such, the BAR is configured to map the target addresses of the interrupt registers on each of the worker computing resources to a corresponding mapped interrupt register address that is managed by the management I/O device controller 215. The size of the BAR can be larger than that of the plurality of interrupt register at the worker computing resources, and can provide access to additional resources in the Worker CPUs' address domain (e.g. the whole DRAM of the CPU for DMA-ing data into any location of it).

For initialization and delivery of interrupts, as the management link CPU and/or I/O device controller 215 has control over configuring the resources on the main side of the PCIe fabric 210, the worker computing resources (e.g., 201 and 206 of FIG. 1) rely on assistance from the management link CPU and/or I/O device controller 215 in configuring the one or more BAR(s) of their NTBs' on the main fabric's side, and also in mapping target addresses from corresponding interrupt registers of the worker computing resources into these one or more BARs. In addition, the worker computing resources 201 and 206 of FIG. 1 also rely on the management link CPU and/or I/O device controller 215 in configuring and initializing interrupts in the I/O devices, such as, PCIe devices 220A-220N.

To carry all the necessary operations out for these tasks, two components are involved, in one embodiment. First, a worker driver (not shown) runs on a corresponding worker computing resource 201, primarily for providing read and write capabilities to the I/O devices. Second a management device driver (not shown) runs on the management link CPU and/or I/O device controller 215 that is configured for performing all the device configuration and major parts of the device initialization. The management device also configures the NTBs on behalf of the worker CPUs. In one embodiment, the management device includes the management link CPU and/or I/O device controller 215 of FIGS. 1-2. The two components exchange configuration information with each other through some channel (e.g. PCIe doorbell, another management network such as Ethernet, etc.), in one embodiment.

In general, interrupt capable PCIe I/O devices have an MSI-x vector table available that is programmed by the management link CPU and/or I/O device controller 215 (on behalf of a corresponding worker computing resource, such as, CPU 201) with the PCIe Destination Message Address (i.e. the address the interrupt message should be destined to, that is, the given CPU's interrupt register), a data field, and a flag field. As shown in FIG. 4, an interrupt capable I/O PCIe I/O device includes an interrupt vector table 430. This table 430 is only available to the physical device driver running on the management link CPU and/or I/O device controller 215. As such, the destination worker computing resource 201 cannot directly program its destination address (of its interrupt register) into a vector of the interrupt vector table 430 (e.g., MSI-x vector) without the aid of the management link CPU and/or I/O device controller 215. Further, the worker computing resource 201 works with the management link CPU and/or device controller 215 to receive interrupts via the mapping feature. As such, as provided by embodiments of the present invention, interrupts coming from one or more I/O devices in the main PCIe fabric are deliverable to any worker computing resource through NTBs that are coupled to the PCIe fabric.

In one embodiment, interrupt initialization is implemented by functionally offloading the interrupt initialization part of device drivers from the worker computing resources 201 to the management I/O device controller 215. That is, management I/O device controller 215 programs the interrupt vectors (e.g., MSI-x) on behalf of the worker computing resources. This is performed in 510, wherein the method of flow diagram 500 includes receiving a request to register a target interrupt register address of a worker interrupt register 410 of a first worker computing resource 201, wherein the target interrupt register address is associated with a first interrupt generated by a first I/O device (not shown in FIG. 4) coupled to a PCI Express (PCIe) fabric 210.

In particular, in operation 1 of FIG. 4, worker computing resource 201 coordinates with the management I/O device controller 215 so that the address range of the interrupt register 410 of the worker computing resource 201 can be mapped to the main PCIe fabric. This allows the management I/O device controller 215 to accurately calculate the address of these interrupt registers in the mapped fabric address range available at the NTB's BAR. Further, the worker computing resource 201 can also specify the number of interrupts it want to register.

Specifically, at 520 of flow diagram 500, the method includes mapping the target interrupt register address to a mapped interrupt register address of a domain in which the first I/O device resides. The mapping is instantiated via a mapped interrupt register 420, in one embodiment.

Once the mapping is accomplished, registration of the interrupt at the specific I/O device (not shown in FIG. 4) is performed. In particular, at 530 of flow diagram 500, the method includes having the management I/O device controller 215 send instructions to the first I/O device to register the mapped interrupt register address in association with the first interrupt in a corresponding I/O interrupt vector table 430 of the first I/O device. In particular, at operation 2a of FIG. 4, the management computing resource 215 verifies with the device that there are sufficient number of interrupt vectors available in the I/O device to register the interrupt (e.g., register a vector with the proper mapped interrupt register address). That is, the method includes determining whether a vector entry is available within the I/O interrupt vector table for registering the first interrupt with the first I/O device for purposes of storing the mapped interrupt register address as a first vector in the I/O interrupt vector table. In addition, the management I/O device controller 215 determines if the I/O device is configured to generate the first interrupt.

The management computing resource 215 gets notified about the outcome of this check. If there are enough number of interrupt vectors available, at operation 2b of FIG. 4, the management I/O device controller 25 notifies the worker computing resource 201 of its availability. As such, at operation 3, the worker computing resource 201 creates the necessary data structures for bookkeeping in its memory 450, and also the data field that identifies the specific I/O device and interrupt (if multiple of them registered) when receiving the first interrupt.

At operation 4 of FIG. 4, the memory address corresponding to an interrupt register address and data field of an interrupt that is contained within a target interrupt register of the worker computing resource 201 is forwarded to the management I/O device controller 215. Specifically, the size of the address space corresponding to the interrupt registration at the worker computing resource 201, and the directory addresses are delivered to the management computing resource 215.

At operation 5, the management I/O device controller 215 performs the mapping of the target interrupt address of the worker computing resource 201 to the mapped interrupt address of the PCIe fabric. In particular, the management I/O device controller 215 writes this data element and the previously calculated and mapped address, which corresponds to the target address of the interrupt register of the worker computing resource 201, into the mapped interrupt register 420. In one embodiment, the mapped interrupt register comprises one or more mapping entries in the NTB. For instance, a first subset of virtual memory space 425 is allocated in the mapped interrupt register 420, which is controlled by the management I/O device controller 215. The first subset is equal in size to that of the target interrupt register managed by the worker computing resource 201. In that manner, the mapping module (e.g., 330 of FIG. 3) of the management I/O device controller 215 is able to map target and destination addresses in one or more worker interrupt registers of a plurality of worker computing resources to a plurality of mapped addresses in the mapped interrupt register of the virtual memory space.

Further, the method of FIG. 5 includes sending the mapped interrupt register address to the first I/O device for storage in the available entry previously discovered. Specifically, the management I/O device controller 215 directs the corresponding I/O device to program or write this data element and the previously calculated and mapped address, which corresponds to the target address of the interrupt register of the worker computing resource 201. The data element and the mapped address are written to the interrupt vector table (e.g., MSI-x vector(s)) of the I/O device.

As operation 6 of FIG. 4, the management I/O device controller 215 enables the interrupt in the I/O device. For example, the management I/O device controller sends an instruction to the I/O device to enable the interrupt. As such, the I/O device, upon a specific event occurring (i.e. a write operation completed, a new packet arrived, etc.), sends an interrupt (e.g., MSI-x message) to the mapped address of the CPU to be interrupted.

At operation 7 of FIG. 4, the management computing resource 215 sends a notification to the first worker computing resource 201 indicating that the first interrupt has been enabled in the I/O device. This completes the initialization of the interrupt that is executed by the management computing resource 215 on behalf of the worker computing resource 201.

FIG. 6 is a block diagram of an example of a computing system 600 capable of implementing embodiments of the present disclosure. Computing system 600 broadly represents any single or multi-processor computing device or system capable of executing computer-readable instructions. Examples of computing system 600 include, without limitation, workstations, laptops, client-side terminals, servers, distributed computing systems, handheld devices, or any other computing system or device. In its most basic configuration, computing system 600 may include at least one processor 610 and a system memory 640.

Both the central processing unit (CPU) 610 and the graphics processing unit (GPU) 620 are coupled to memory 640. System memory 640 generally represents any type or form of volatile or non-volatile storage device or medium capable of storing data and/or other computer-readable instructions. Examples of system memory 640 include, without limitation, RAM, ROM, flash memory, or any other suitable memory device. In the example of FIG. 6, memory 640 is a shared memory, whereby the memory stores instructions and data for both the CPU 610 and the GPU 620. Alternatively, there may be separate memories dedicated to the CPU 610 and the GPU 620, respectively. The memory can include a frame buffer for storing pixel data drives a display screen 630.

The system 600 includes a user interface 660 that, in one implementation, includes an on-screen cursor control device. The user interface may include a keyboard, a mouse, and/or a touch screen device (a touchpad).

CPU 610 and/or GPU 620 generally represent any type or form of processing unit capable of processing data or interpreting and executing instructions. In certain embodiments, processors 610 and/or 620 may receive instructions from a software application or hardware module. These instructions may cause processors 610 and/or 620 to perform the functions of one or more of the example embodiments described and/or illustrated herein. For example, processors 610 and/or 620 may perform and/or be a means for performing, either alone or in combination with other elements, one or more of the monitoring, determining, gating, and detecting, or the like described herein. Processors 610 and/or 620 may also perform and/or be a means for performing any other steps, methods, or processes described and/or illustrated herein.

Further, system 600 includes a management I/O device controller 215 that is configured for initialization of an interrupt at an I/O device, in a communication system including a plurality of worker computing resources, a plurality of I/O devices, a management I/O device controller, and a PCIe fabric enabling communication between all the components in the system, in embodiments of the present invention.

In some embodiments, the computer-readable medium containing a computer program may be loaded into computing system 600. All or a portion of the computer program stored on the computer-readable medium may then be stored in system memory 640 and/or various portions of storage devices. When executed by processors 610 and/or 620, a computer program loaded into computing system 600 may cause processor 610 and/or 620 to perform and/or be a means for performing the functions of the example embodiments described and/or illustrated herein. Additionally or alternatively, the example embodiments described and/or illustrated herein may be implemented in firmware and/or hardware.

Embodiments of the present disclosure may be implemented by using hardware only or by using software and a necessary universal hardware platform. Based on such understandings, the technical solution of the present disclosure may be embodied in the form of a software product. The software product includes a number of instructions that enable a computer device (personal computer, server, or network device) to execute the method provided in the embodiments of the present disclosure.

Embodiments described herein may be discussed in the general context of computer-executable instructions residing on some form of computer-readable storage medium, such as program modules, executed by one or more computers or other devices. By way of example, and not limitation, the software product may be stored in a nonvolatile or non-transitory computer-readable storage media that may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), USB flash disk, digital versatile disks (DVDs) or other optical storage, magnetic cassettes, magnetic tape, removable hard disk, magnetic disk storage or other magnetic storage devices, or any other medium that can be used to store the desired information and that can be accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Thus, according to embodiments of the present disclosure, systems and methods are described for the initialization of an interrupt at an I/O device, in a communication system including a plurality of worker computing resources, a plurality of I/O devices, a management I/O device controller, and a PCIe fabric enabling communication between all the components in the system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

Although the present invention and its advantages have been described in detail, it should be understood that various changes, substitutions, and alterations can be made herein without departing from the spirit and scope of the invention as defined by the appended claims. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the present disclosure are thus described. While the present disclosure has been described in particular embodiments, it should be appreciated that the disclosure should not be construed as limited by such embodiments, but rather construed according to the below claims.

The invention claimed is:

1. A management CPU in a PCI Express (PCIe) network, comprising:
a memory;
a processor for managing initialization of a plurality of I/O devices coupled to a PCIe fabric of the management CPU, wherein the PCIe fabric includes a non-transparent bridge (NTB) through which the PCIe fabric is coupled to a worker CPU of the PCIe network;
the processor being configured to perform operations of:
receiving a request from the worker CPU to enable a first I/O device in the PCIe fabric of the management CPU to send a first interrupt to the worker CPU, wherein the worker CPU has assigned a target interrupt register address for receiving the first interrupt;
mapping the target interrupt register address to a mapped interrupt register address for use by the first I/O device in the PCIe fabric of the management CPU to sent the first interrupt to the worker CPU through the NTB; and
sending an instruction to the first I/O device to register the mapped interrupt register address for the first interrupt in a I/O interrupt vector table of the first I/O device.

2. The management CPU of claim 1, wherein the processor is further configured for determining, prior to sending the instruction to the first I/O device, whether space is available in the I/O interrupt vector table of the first I/O device for registering the mapped interrupt register address for the first interrupt.

3. The management CPU of claim 1, wherein the processor is further configured for receiving from the worker CPU information related to a size of a target interrupt register of the worker CPU.

4. The management CPU of claim 1, wherein the processor is further configured for sending an instruction to the I/O device to enable the first interrupt in the first I/O device, and sending a notification to the worker CPU indicating that the first interrupt has been enabled in the first I/O device.

5. The management CPU of claim 1, wherein the first interrupt is a Message Signaled Interrupts eXtended (MSI-X) interrupt.

6. A PCI Express (PCIe) network, comprising:
a management CPU;
a worker CPU;
a PCIe fabric of the management CPU, the PCIe fabric comprising a plurality of I/O devices and a non-transparent bridge (NTB) through which the PCIe fabric is coupled to the worker CPU;
the management CPU is configured to perform operations of:
receiving a request from the worker CPU to enable a first I/O device in the PCIe fabric of the management CPU to send a first interrupt to the worker CPU, wherein the worker CPU has assigned a target interrupt register address for receiving the first interrupt;
mapping the target interrupt register address to a mapped interrupt register address for use by the first I/O device in the PCIe fabric of the management CPU to sent the first interrupt to the worker CPU through the NTB; and
sending an instruction to the first I/O device to register the mapped interrupt register address for the first interrupt in a I/O interrupt vector table of the first I/O device.

7. The PCIe network of claim 6, wherein the management CPU is further configured for determining, prior to sending the instruction to the first I/O device, whether space is available in the I/O interrupt vector table of the first I/O device for registering the mapped interrupt register address for the first interrupt.

8. The PCIe network of claim 6, wherein the management CPU is further configured for receiving from the worker CPU information related to a size of a target interrupt register of the worker CPU.

9. The PCIe network of claim 6, wherein the management CPU is further configured for sending an instruction to the I/O device to enable the first interrupt in the first I/O device, and sending a notification to the worker CPU indicating that the first interrupt has been enabled in the first I/O device.

10. The PCIe network of claim 6, wherein the first interrupt is a Message Signaled Interrupts eXtended (MSI-X) interrupt.

11. A method performed by a management CPU in a PCI Express (PCIe) network, comprising:
receiving a request from a worker CPU in the PCIe network to enable a first I/O device in a PCIe fabric of the management CPU to send a first interrupt to the worker CPU, wherein the PCIe fabric of the management CPU includes a non-transparent bridge (NTB) through which the PCIe fabric is coupled to the worker CPU, and wherein the worker CPU has assigned a target interrupt register address for receiving the first interrupt;
mapping the target interrupt register address to a mapped interrupt register address for use by the first I/O device in the PCIe fabric of the management CPU to sent the first interrupt to the worker CPU through the NTB; and
sending an instruction to the first I/O device to register the mapped interrupt register address for the first interrupt in a I/O interrupt vector table of the first I/O device.

12. The method of claim 11, further comprising:
determining, by the management CPU prior to sending the instruction to the first I/O device, whether space is available in the I/O interrupt vector table of the first I/O device for registering the mapped interrupt register address for the first interrupt.

13. The method of claim 11, wherein the step of receiving the request from the worker CPU comprises receiving information related to a size of a target interrupt register of the worker CPU.

14. The method of claim 11, further comprising:
sending an instruction to the I/O device to enable the first interrupt in the first I/O device, and sending a notification to the worker CPU indicating that the first interrupt has been enabled in the first I/O device.

15. The method of claim 11, wherein the first interrupt is a Message Signaled Interrupts eXtended (MSI-X) interrupt.

* * * * *